(12) United States Patent
Nakatsugawa

(10) Patent No.: US 6,747,982 B2
(45) Date of Patent: *Jun. 8, 2004

(54) COMMUNICATION METHOD, COMMUNICATION SYSTEM, AND GATE WAY USED IN THE COMMUNICATION SYSTEM

(75) Inventor: Yoshinori Nakatsugawa, Susono (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,625

(22) Filed: Feb. 23, 1998

(65) Prior Publication Data

US 2002/0057704 A1 May 16, 2002

(30) Foreign Application Priority Data

Feb. 21, 1997 (JP) ............................ P 9-038037
Jul. 4, 1997 (JP) ............................ P 9-179999

(51) Int. Cl.$^7$ ............................................. H04L 12/27
(52) U.S. Cl. ...................................... 370/403; 370/392
(58) Field of Search .................. 370/401, 402, 370/403, 404, 405, 409, 392, 463, 466, 389, 400; 709/238, 240, 242, 245, 249

(56) References Cited

U.S. PATENT DOCUMENTS

| | | | | |
|---|---|---|---|---|
| 5,027,350 A | * | 6/1991 | Marshall | 370/401 |
| 5,166,931 A | * | 11/1992 | Riddle | 370/401 |
| 5,241,682 A | * | 8/1993 | Bryant et al. | 370/401 |
| 5,315,580 A | * | 5/1994 | Phaal | 370/232 |
| 5,515,513 A | * | 5/1996 | Metzger et al. | 709/249 |
| 5,615,340 A | * | 3/1997 | Dai et al. | 370/419 |
| 5,781,550 A | * | 7/1998 | Templin et al. | 370/401 |
| 5,841,764 A | * | 11/1998 | Roderique et al. | 370/310 |
| 5,883,890 A | * | 3/1999 | Okanoue et al. | 370/338 |
| 6,011,790 A | * | 1/2000 | Fisher | 370/349 |
| 6,400,729 B1 | * | 6/2002 | Shimadoi et al. | 370/466 |

FOREIGN PATENT DOCUMENTS

| | | |
|---|---|---|
| EP | 0 406 486 | 1/1991 |
| JP | 59-62245 | 4/1984 |
| JP | 61-2451 | 1/1986 |
| JP | 63-28334 | 11/1988 |
| JP | 3-44294 | 2/1991 |
| JP | 3-65703 | 10/1991 |
| JP | 5-284165 | 10/1993 |
| JP | 6-81142 | 10/1994 |
| JP | 8-31859 | 3/1996 |

* cited by examiner

Primary Examiner—Frank Duong
Assistant Examiner—Melanie Jagannathan
(74) Attorney, Agent, or Firm—Oblon, Spivak, McClelland, Maier & Neustadt, P.C.

(57) ABSTRACT

Upon executing data exchange between a pair of LAN's via a gate way, a root hub transmits the communication data, in an address describing area of which source/destination addresses are described, and a gate way decodes the source/destination addresses included in received communication data, decides whether or not the source and the destination belong to the same LAN based on decoded source/destination addresses and attribution identification information, selects an appropriate route as the destination of the communication data based on a result of this attribution decision, and then transmits the communication data to the destination via selected route.

18 Claims, 6 Drawing Sheets

AL : ADDRESS LENGTH
S :SOURCE
D :DESTINATION
RDN :RELAY DEVICE NUMBER/NODE NUMBER
MT :MESSAGE TYPE
ML  MESSAGE LENGTH
CRC :CYCLIC REDUNDANCY CHECK
ACK :ACKNOWLEDGE
NAK :NEGATIVE ACKNOWLEDGE

COMMUNICATION METHOD, COMMUNICATION SYSTEM, AND GATE WAY USED IN THE COMMUNICATION SYSTEM

BACKGROUND OF THE INVENTION

1. Field of the Invention

The present invention relates to a communication method for use in a communication system constructed by connecting a pair of networks, which are constructed by connecting a plurality of relay units to which one or more than two node terminals are connected respectively via data transfer lines, via a gate way to execute data exchange between the node terminals, the relay terminals, or the node terminal and the relay terminal. More particularly, the present invention relates to a communication method capable of surely transmitting communication data to a destination while remarkably increasing data transmission capability per unit time, a communication system, and a gate way used in this communication system.

2. Description of the Prior Art

In the prior art, as disclosed in Patent Application Publication (KOKAI) 59-62245, for example, a data communication system has been widely known in which a plurality of local area networks (referred to as "LAN's" hereinafter) used to execute data exchange between a plurality of stations are connected via gate ways to enable data exchange between LANs.

According to the technology disclosed in the above Publication, in addition to a transmitter/receiver address for designating the transmitter and the receiver of data respectively, a transmitting or receiving station address indicating the data transmitting or receiving station and a network address indicating the network to which the data transmitting or receiving station belongs have been provided in the transmitter/receiver address of the communication data. Hence, even if data communication is to be carried out beyond its own network, certain data communication between different LAN's has been made possible by referring to these addresses upon data communication.

However, in the above communication system in the prior art, since there has existed a large variety of addresses to be attached to the communication data, an information writing area of relatively large capacity must be prepared as address writing area in the communication data. Therefore, such a problem to be solved has been involved in the prior art that this becomes a barrier upon increasing data transmission capability per unit time.

SUMMARY OF THE INVENTION

The present invention has been made in light of the above circumstances, and it is an object of the present invention to provide a communication method, a communication system, and a gate way used in the communication system, which are capable of transmitting communication data to a destination without fail while increasing remarkably data transmission capability per unit time, by describing previously source/destination addresses in a small amount of address describing area provided in the communication data, then transmitting the communication data, in which the source/destination addresses are described, to a destination by the relay units, then decoding the source/destination addresses included in received communication data by the gate way, then deciding whether or not the source and the destination belong to a same network, by the gate way based on decoded source/destination addresses and attribution identification information stored previously, and then selecting an appropriate route as the destination of the communication data based on a result of attribution decision and then transmitting the communication data to the destination via the selected route by the gate way.

In order to achieve the above object of the present invention, there is provided a communication method for use in a communication system constructed by connecting a pair of networks, which are constructed by connecting a plurality of relay units to which one or more than two node terminals are connected respectively via data transfer lines, via a gate way so as to execute data exchange between the node terminals, the relay units, or the node terminal and the relay unit, the communication method comprising the steps of: describing source/destination addresses previously in an address describing area provided in communication data as transmission object by the relay units; transmitting the communication data, in which the source/destination addresses are described, to a destination by the relay units; decoding the source/destination addresses included in received communication data by the gate way; deciding whether or not a source and the destination belong to a same network, by the gate way based on the decoded source/destination addresses and attribution identification information stored previously; and selecting an appropriate route as the destination of the communication data based on a result of attribution decision and then transmitting the communication data to the destination via the selected route by the gate way.

According to the present invention, first the relay units transmits the communication data, in the address describing area of which the source/destination addresses are described, to the destination. Then the gate way decodes the source/destination addresses included in received communication data, then decides whether or not the source and the destination belong to the same network based on the decoded source/destination addresses and attribution identification information stored previously, then selects the appropriate route as the destination of the communication data based on the result of attribution decision, and then transmits the communication data to the destination via the selected route.

Hence, according to the present invention, the communication data can be transmitted surely to the destination while increasing remarkably data transmission capability per unit time only by describing the source/destination addresses previously in a small amount of the address describing area provided in communication data.

In the preferred embodiment of the present invention, the appropriate route selecting step and the communication data transmitting step by the gate way comprise the steps of: selecting a route for own network, to which the source belongs, as the destination of the communication data by the gate way when it has been decided based on a result of the attribution decision that the source and the destination belong to the same network, and transmitting the communication data to the destination via the selected route for own network by the gate way.

According to this embodiment, when it has been decided based on the result of the attribution decision that the source and the destination belong to the same network, the gate way selects a route for own network, to which the source belongs, as the destination of the communication data, and then transmits the communication data to the destination via the selected route for own network.

In the preferred embodiment of the present invention, the appropriate route selecting step and the communication data transmitting step by the gate way comprise the steps of: selecting a route for other network, to which the source does not belong, as the destination of the communication data by the gate way when it has been decided based on a result of the attribution decision that the source and the destination do not belong to the same network, and transmitting the communication data to the destination via the selected route for other network by the gate way.

According to this embodiment, when it has been decided based on a result of the attribution decision that the source and the destination do not belong to the same network, the gate way selects a route for other network, to which the source does not belong, as the destination of the communication data, and then transmits the communication data to the destination via the selected route for other network.

In order to achieve the above object of the present invention, there is provided a communication method for use in a communication system constructed by connecting a pair of networks, which are constructed by connecting a plurality of relay units to which one or more than two node terminals are connected respectively via data transfer lines, via a gate way so as to execute data exchange between the node terminals, the relay units, or the node terminal and the relay unit, the communication method comprising the steps of: describing source/destination addresses previously in an address describing area provided in communication data as transmission object by the relay units; transmitting the communication data, in which the source/destination addresses are described, to a destination by the relay units; decoding the source/destination addresses included in received communication data by the gate way; deciding whether or not a source and the destination belong to a same network, by the gate way based on the decoded source/destination addresses and attribution identification information stored previously; and selecting a route for own network, to which the source belongs, as the destination of the communication data by the gate way when it has been decided based on a result of the attribution decision that the source and the destination belong to the same network, otherwise selecting a route for other network, to which the source does not belong, as the destination of the communication data by the gate way when it has been decided based on a result of the attribution decision that the source and the destination do not belong to the same network, and then transmitting the communication data to the destination via the selected route for one of own network and other network by the gate way.

According to the present invention, first the relay units transmits the communication data, in the address describing area of which the source/destination addresses are described, to the destination. Then the gate way decodes the source/destination addresses included in received communication data, then decides whether or not the source and the destination belong to the same network based on decoded source/destination addresses and attribution identification information stored previously, then selects a route for own network, to which the source belongs, as the destination of the communication data by the gate way when it has been decided based on a result of the attribution decision that the source and the destination belong to the same network, otherwise selects a route for other network, to which the source does not belong, as the destination of the communication data by the gate way when it has been decided based on a result of the attribution decision that the source and the destination do not belong to the same network, and then transmits the communication data to the destination via the selected route for one of own network and other network.

Hence, according to the present invention, the communication data can be transmitted surely to the destination while increasing remarkably data transmission capability per unit time only by describing the source/destination addresses previously in a small amount of the address describing area provided in communication data.

In order to achieve the above object of the present invention, there is provided a communication system constructed by connecting a pair of networks, which are constructed by connecting a plurality of relay units to which one or more than two node terminals are connected respectively via data transfer lines, via a gate way so as to execute data exchange between the node terminals, the relay units, or the node terminal and the relay unit, each of the relay units comprising: transmitting means for transmitting the communication data, in an address describing area of which the source/destination addresses are described, to a destination; and the gate way comprising: decoding means for decoding the source/destination addresses included in received communication data; identification information storing means for storing attribution identification information which correlate addresses of the node terminals and the relay units, which belong to a pair of networks respectively, with respective networks; attribution deciding means for deciding whether or not a source and the destination belong to a same network, based on the source/destination addresses decoded by the decoding means and the attribution identification information stored in the identification information storing means; and route selecting means for selecting an appropriate route as the destination of the communication data based on a result of attribution decision carried out by the attribution deciding means, and then transmitting the communication data to the destination via the selected route.

According to the present invention, at first the transmitting means of the relay units transmits the communication data, in an address describing area of which the source/destination addresses are described, to a destination. Then, in the gate way, the decoding means of the gate way decoding the source/destination addresses included in received communication data. The identification information storing means stores attribution identification information which correlate addresses of the node terminals and the relay units, which belong to a pair of networks respectively, with respective networks. Then, the attribution deciding means decides whether or not the source and the destination belong to the same network, based on the source/destination addresses decoded by the decoding means and the attribution identification information stored in the identification information storing means. Then, the route selecting means selects the appropriate route as the destination of the communication data based on a result of attribution decision carried out by the attribution deciding means, and then transmits the communication data to the destination via the selected route.

Hence, according to the present invention, the communication data can be transmitted surely to the destination while increasing remarkably data transmission capability per unit time only by describing the source/destination addresses previously in a small amount of the address describing area provided in communication data.

In order to achieve the above object of the present invention, there is provided a gate way for use in a communication system constructed by connecting a pair of networks, which are constructed by connecting a plurality of relay units to which one or more than two node terminals are connected respectively via data transfer lines, via a gate way so as to execute data exchange between the node terminals, the relay units, or the node terminal and the relay unit, the gate way comprising: four input/out terminals including a pair of first and second input terminals and a pair of first and second output terminals, the first input terminal and the first output terminal being connected to one network and the second input terminal and the second output terminal being connected to other network to thus connect the pair of networks mutually; decoding means for decoding source/destination addresses included in the communication data received from the source; identification information storing means for storing attribution identification information which correlate addresses of the node terminals and the relay units, which belong to a pair of networks respectively, with respective networks; attribution deciding means for deciding whether or not a source and a destination belong to a same network, based on the source/destination addresses decoded by the decoding means and the attribution identification information stored in the identification information storing means; and route selecting means for selecting one of the first output terminal and the second output terminal as the destination of the communication data received via the first input terminal and also selecting one of the first output terminal and the second output terminal as the destination of the communication data received via the second input terminal, based on a result of attribution decision carried out by the attribution deciding means, and then transmitting the communication data to the destination via selected output terminal.

According to the present invention, first the decoding means decodes source/destination addresses included in the communication data received from the source. Then, the attribution deciding means decides whether or not the source and the destination belong to a same network, based on the source/destination addresses decoded by the decoding means and the attribution identification information stored in the identification information storing means. Then, the route selecting means selects one of the first output terminal and the second output terminal as the destination of the communication data received via the first input terminal and also selects one of the first output terminal and the second output terminal as the destination of the communication data received via the second input terminal, based on the result of attribution decision carried out by the attribution deciding means, and then transmits the communication data to the destination via selected output terminal.

Hence, according to the present invention, the communication data can be transmitted surely to the destination while increasing remarkably data transmission capability per unit time only by describing the source/destination addresses previously in a small amount of the address describing area provided in communication data.

In the preferred embodiment of the present invention, the route selecting means selects an output terminal for own network, to which the source belongs, as the destination of the communication data when it has been decided, as a result of the attribution decision carried out by the attribution deciding means, that the source and the destination belong to the same network, otherwise selects an output terminal for other network, to which the source does not belong, as the destination of the communication data when it has been decided, as a result of the attribution decision carried out by the attribution deciding means, that the source and the destination do not belong to the same network, and then transmits the communication data to the destination via the selected output terminals for one of own network and other network.

According to this embodiment, the route selecting means selects an output terminal for own network, to which the source belongs, as the destination of the communication data when it has been decided, as a result of the attribution decision carried out by the attribution deciding means, that the source and the destination belong to the same network, otherwise selects an output terminal for other network, to which the source does not belong, as the destination of the communication data by the gate way when it has been decided, as a result of the attribution decision carried out by the attribution deciding means, that the source and the destination do not belong to the same network, and then transmits the communication data to the destination via the selected output terminal for one of own network other network.

In the preferred embodiment of the present invention, a gate way further comprises mixing means for multiplexing received communication data when the first output terminal has been selected as the destination of the communication data received via the first input terminal and the second input terminal respectively and then transmitting multiplexed communication data to the destination via the selected first output terminal, otherwise multiplexing received communication data when the second output terminal has been selected as the destination of the communication data received via the first input terminal and the second input terminal respectively and then transmitting multiplexed communication data to the destination via the selected second output terminal.

According to this embodiment, the mixing means for multiplexing received communication data when the first output terminal has been selected as the destination of the communication data received via the first input terminal and the second input terminal respectively and then transmitting multiplexed communication data to the destination via the selected first output terminal, otherwise multiplexing received communication data when the second output terminal has been selected as the destination of the communication data received via the first input terminal and the second input terminal respectively and then transmitting multiplexed communication data to the destination via the selected second output terminal.

In order to achieve the above object of the present invention, there is provided a gate way for use in a communication system constructed by connecting a pair of networks, which are constructed by connecting a plurality of relay units to which one or more than two node terminals are connected respectively via data transfer lines, via a gate way so as to execute data exchange between the node terminals, the relay units, or the node terminal and the relay unit, the gate way comprising: four input/out terminals including a pair of first and second input terminals and a pair of first and second output terminals, the first input terminal and the first output terminal being connected to one network and the second input terminal and the second output terminal being connected to other network to thus connect the pair of networks mutually; first decoding means for decoding source/destination addresses included in the communication data received from the relay unit belonging to one of the pair of networks; second decoding means for decoding the source/destination addresses included in the communication data received from the relay unit belonging to other of the pair of networks; first identification information storing means for storing addresses of the node terminals and the relay units belonging to one of the pair of networks as first attribution identification information; second identification information storing means for storing addresses of the node terminals and the relay units belonging to other of the pair of networks as second attribution identification information; first attribution deciding means for deciding whether or not a source and a destination belong to one of the pair of networks, based on the source/destination addresses decoded by the first decoding means and the first attribution identification information stored in the first identification information storing means; second attribution deciding means for deciding whether or not a source and a destination belong to other of the pair of networks, based on the source/destination addresses decoded by the second decoding means and the second attribution identification information stored in the second identification information storing means; first route selecting means for selecting a route for one of the first output terminal and the second output terminal as the destination of the communication data received via the first input terminal, based on a result of attribution decision carried out by the first attribution deciding means, and then transmitting the communication data to the destination via the selected route for one of the first output terminal and the second output terminal; and second route selecting means for selecting a route for other of the first output terminal and the second output terminal as the destination of the communication data received via the second input terminal, based on a result of attribution decision carried out by the second attribution deciding means, and then transmitting the communication data to the destination via the selected route for other of the first output terminal and the second output terminal.

According to the present invention, since the gate way is constructed to be divided into the collective functional means for executing various processes of the communication data which are received from the relay units belonging to one of the networks, and the collective functional means for executing various processes of the communication data which are received from the relay units belonging to the other of the networks, such gate way which enables to separate a pair of networks easily can be achieved.

In the preferred embodiment of the present invention, the route through which the communication data received via the first input terminal are supplied to the second output terminal and the route through which the communication data received via the second input terminal are supplied to the first output terminal are constructed by any communication medium which enable transmission of the communication data.

According to this embodiment, since the route through which the communication data received via the first input terminal are supplied to the second output terminal and the route through which the communication data received via the second input terminal are supplied to the first output terminal are constructed by any communication medium which enable transmission of the communication data, data exchange between the pair of networks can be readily achieved via appropriate communication medium even when one and the other of the networks are placed at mutually separated locations, for example.

The nature, principle and utility of the invention will become more apparent from the following detailed description when read in conjunction with the accompanying drawings.

DESCRIPTION OF THE PREFERRED EMBODIMENTS

A communication method, a communication system, and a gate way used in this communication system according to embodiments of the present invention will be explained in detail with reference to the accompanying drawings hereinafter.

Figure 1:
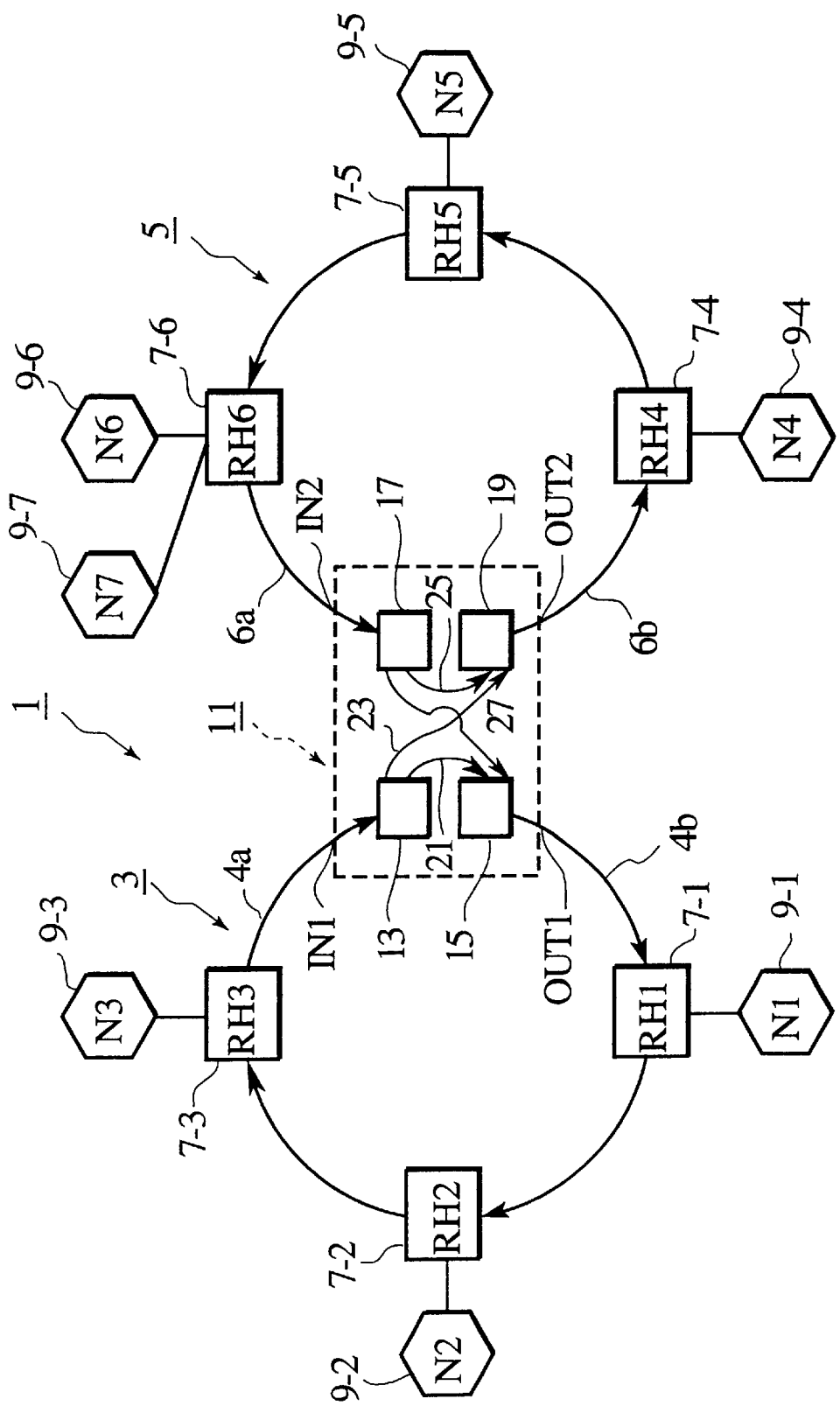
FIG. 1 is a schematic block circuit diagram showing a configuration of a communication system according to a first embodiment of the present invention.

First, as shown in FIG. 1, a communication system 1 according to a first embodiment of the present invention is constructed by connecting first and second LAN's 3, 5, which are constructed by connecting a plurality of root hubs 7-1, 7-2, . . . , 7-6 via loop data transmission lines 4a, 4b, 6a, 6b respectively, via a gate way 11 mutually data-interchangeably. As a network topology for the first and second LAN's 3, 5, for example, bus type, star type, etc., for example, may be employed other than the above loop type.

One or more than two node terminals N are connected to a plurality of root hubs RH respectively. Regardless of whether or not the destination and the source belong to the same LAN, the root hubs RH, the node terminals N, or the node terminal and the root hub RH are constructed mutually data-interchangeably via the loop type data transmission lines which enable transmission of communication data indicated by an arrow in FIG. 1, for example.

If the communication system according to the present invention is applied to the vehicle communication system, for example, which enables exchange of various data such as digital audio data mutually, various devices such as a portable telephone, a facsimile device (FAX), a digital TV set, a radio receiver, a navigation system (NV), a DVD (Digital Video Disc, or Digital Versatile Disc)-ROM drive, a CD (Compact Disc)-ROM drive, a DAT (Digital Audio Taperecorder), a MD (Mini Disc) player, an audio amplifier including DSP (Digital Signal Processor), a CAN (Controller Area Network) interface, various sensors such as an azimuth sensor, a speed sensor, etc., a monitor device, and a vehicle-equipped personal computer, etc. may be employed appropriately as the node terminals N.

As shown in FIG. 1, inherent addresses are allocated like RH1, RH2, . . . , RH6 to a plurality of root hubs (RH) 7-1, 7-2, . . . , 7-6 respectively, whereas inherent addresses are allocated like N1, N2, . . . , N7 to node terminals (N) 9-1, 9-2, . . . , 9-7 respectively. As described later, addresses allocated to the root hubs (RH) and the node terminals (N) respectively are used to describe destination or source addresses and used to determine whether or not a certain root hub (RH) or a certain node terminal (N) belongs to a certain LAN.

As shown in FIG. 1, the gate way 11 is constructed to have four input/output terminals including a pair of first and second input terminals IN1, IN2 and a pair of first and second output terminals OUT1, OUT2. Also, a pair of LANs 3, 5 are connected mutually by connecting the first input terminal IN1 and the first output terminal OUT1 of the gate way 11 to the first LAN 3 and connecting the second input terminal IN2 and the second output terminal OUT2 of the gate way 11 to the second LAN 5.

Further, the gate way 11 has a protocol conversion function and a route selection function respectively. According to such protocol conversion function, a protocol conversion can be executed to accommodate the communication data, which are sent out from the node terminal N or the root hub RH belonging to the first LAN 3, to protocol of the second LAN 5, and then the converted communication data can be sent out to the node terminal N or the root hub RH belonging to the second LAN 5, and also the protocol conversion can be executed to accommodate the communication data, which are sent out from the node terminal N or the root hub RH belonging to the second LAN 5, to protocol of the first LAN 3, and then the converted communication data can be sent out to the node terminal N or the root hub RH belonging to the first LAN 3. According to such route selection function, the communication data which are sent out from the node terminal N or the root hub RH belonging to the first LAN 3 or the second LAN 5 are received, then the source/destination addresses which are described in the address describing area of the information describing area of the received communication data can be decoded, then whether or not both the destination and the source belong to the same LAN can be determined based on the decoded source/destination addresses and attribution identification information to be described later, then appropriate routes as the destination for the communication data source can be selected based on the attribution determination result, and then the communication data can be sent out via the selected route. If the common protocol is employed by the first LAN 3 and the second LAN 5, the gate way 11 can execute data exchange between the first LAN 3 and the second LAN 5 without the protocol conversion process.

Figure 2:
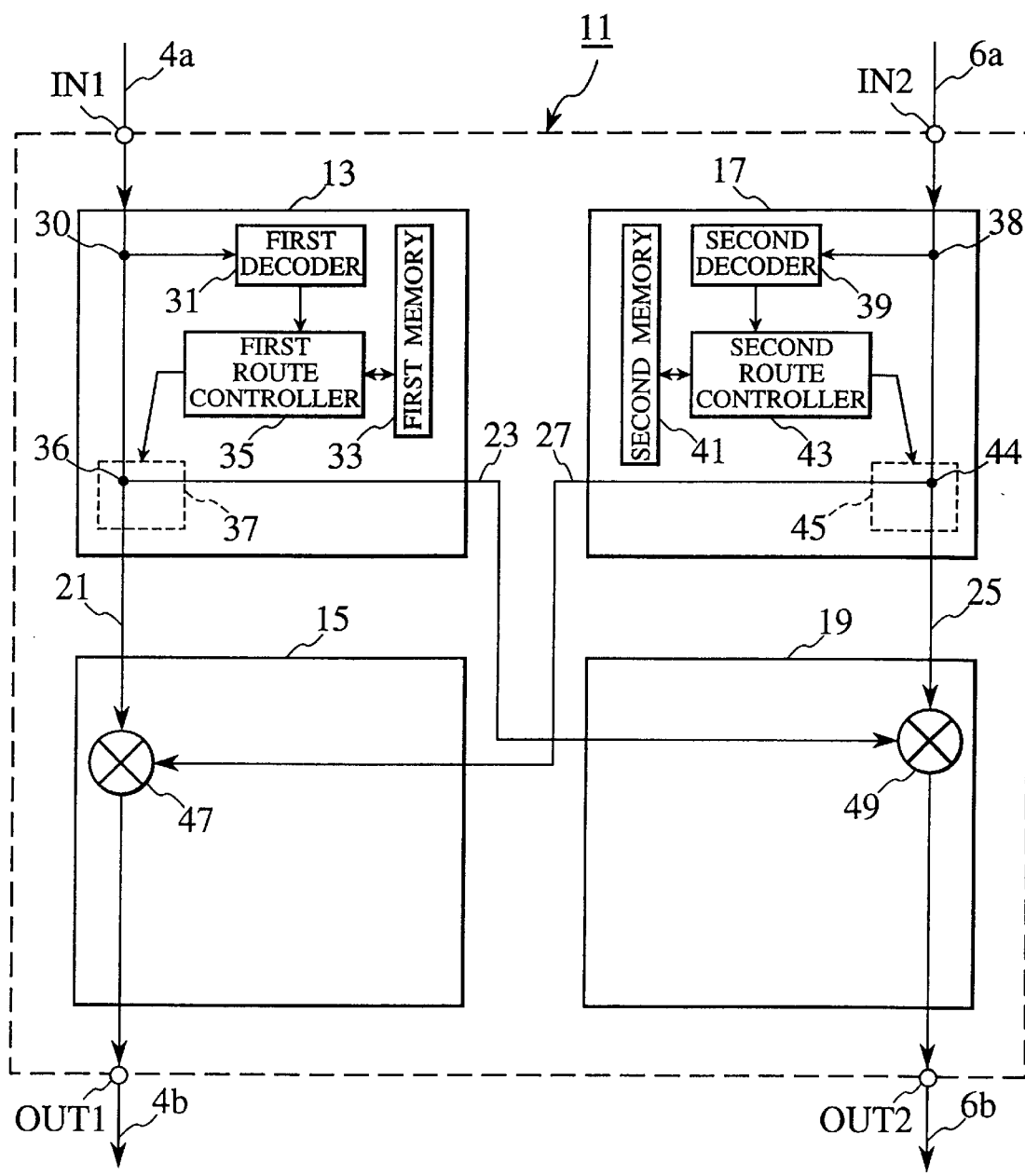
FIG. 2 is a block circuit diagram showing a gate way shown in FIG. 1.

In more detail, as shown in FIG. 1 or FIG. 2, for example, the gate way 11 comprises a first distributor 13 and a second distributor 17, and a first mixer 15 and a second mixer 19. More specifically, each of the first distributor 13 and the second distributor 17 can always monitor the presence of the communication data which are sent out from the node terminal N or the root hub RH belonging to the first LAN 3 or the second LAN 5, then decode the source/destination addresses described in the communication data being passed when passing of the communication data can be detected, then decide based on the decoded source/destination addresses and the attribution identification information whether or not both the destination and the source belong to the same LAN, then select the appropriate route as the destination of the communication data based on the decision result, and then switch the data transfer destination to the selected route. The first mixer 15 and the second mixer 19 can send out the communication data to the data transfer destinations which are switched by the first distributor 13 and the second distributor 17 respectively.

In addition, the first distributor 13 comprises a first decoder 31, a first memory 33, a first route controller 35, and a first route switcher 37. Similarly, the second distributor 17 comprises a second decoder 39, a second memory 41, a second route controller 43, and a second route switcher 45. More particularly, the first decoder 31 and the second decoder 39 are connected to a first branch point 30 and a second branch point 38 to branch off from input side data transfer lines 4a, 6a connected to a first input terminal IN1 and a second input terminal IN2 respectively. Also, the first decoder 31 and the second decoder 39 can always monitor the presence of the communication data which are sent out from the node terminal N or the root hub RH belonging to the first LAN 3 or the second LAN 5 respectively, and then decode the source/destination addresses described in the communication data being passing when the passing of the communication data can be detected respectively. Then, the first memory 33 can store the addresses of the root hubs (RH) 7 and the node terminals (N) 9 belonging to the first LAN 3 as the first attribution identification information. Also, the second memory 41 can store the addresses of the root hubs (RH) 7 and the node terminals (N) 9 belonging to the second LAN 5 as the second attribution identification information. Then, the first route controller 35 and the second route controller 43 can decide whether or not both the destination and the source belong to the same LAN, based on the source/destination addresses decoded by the first decoder 31 and the second decoder 39 respectively and the first and second attribution identification information stored in the first memory 33 and the second memory 41, and then select the appropriate route as the transfer destination of the communication data based on this attribution decision result respectively. Then, the first route switcher 37 and the second route switcher 45 can switch the data transfer destination to the selected routes out of a pair of routes 21, 23 or a pair of routes 25, 27 which are connected to a third branch point 36 and a fourth branch point 44 respectively.

Further, the first mixer 15 and the second mixer 19 comprise a first multiplexer 47 and a second multiplexer 49 respectively. The first multiplexer 47 and the second multiplexer 49 can multiplex the communication data of own LAN and the communication data of other LAN when the communication data are sent out onto the selected route, and then send out multiplexed communication data to output side data transfer lines 4b, 6b via the first output terminal OUT1 and the second output terminal OUT2 respectively.

Figure 3:
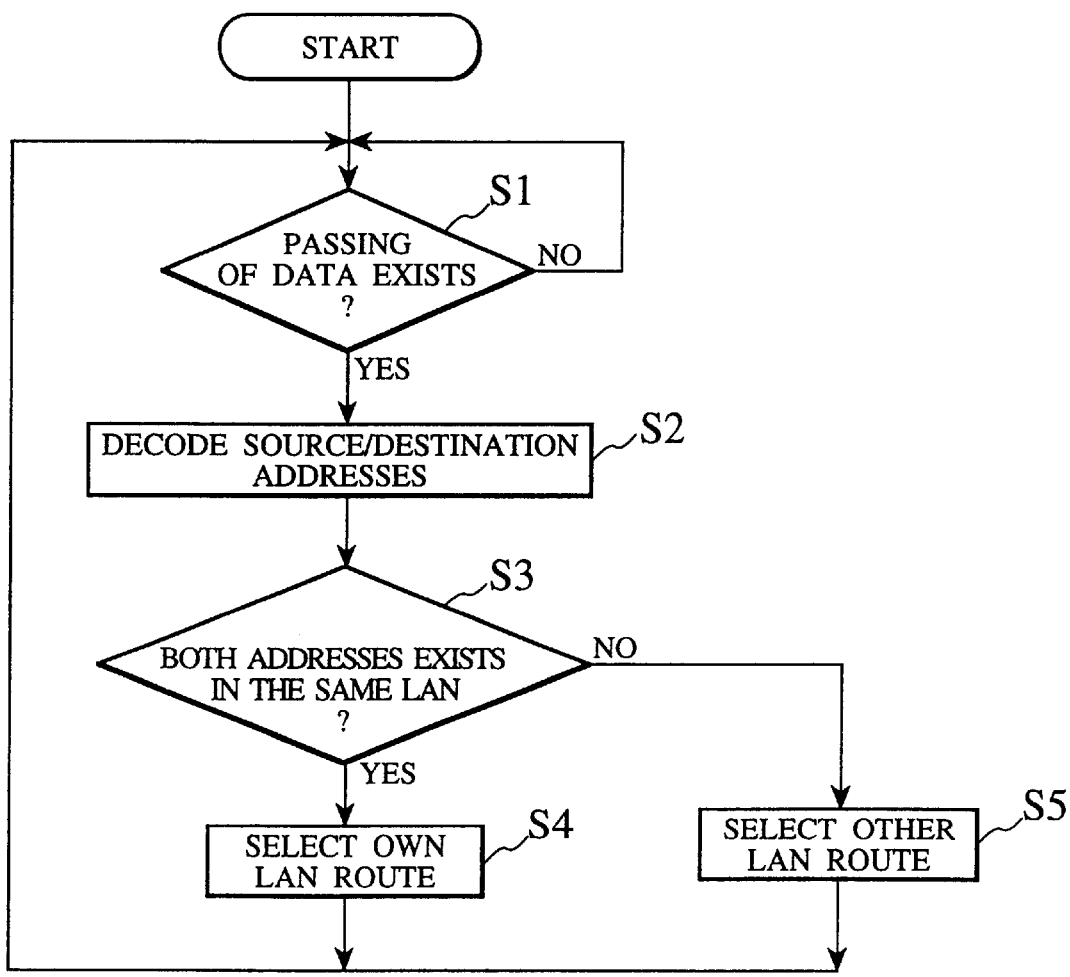
FIG. 3 is a flowchart illustrative of an operation of the communication system according to the first embodiment of the present invention shown in FIG. 1.

Next, an operation of the communication system according to the present invention constructed as above will be explained with reference to FIG. 3, while taking the node terminal (N1) 9-1 belonging to the first LAN 3 selected as the source of the communication data as an example.

At first, the first decoder 31 always monitors whether or not passing of the communication data which are sent out from the root hub (RH) or the node terminal (N) belonging to the first LAN 3 exists (step S1). Then, if passing of the communication data exists, a process of decoding the source/destination addresses described in the communication data being passing is carried out (step S2).

In response to the source/destination addresses decoded by step S2, the first route controller 35 decides, based on the decoded source/destination addresses and the first attribution identification information stored in the first memory 33, whether or not the destination and the source belong to the same LAN (step S3). Then, the first route controller 35 selects the appropriate route as the destination of the communication data based on this attribution decision result.

More specifically, as the result of attribution decision in step S3, if the destination and the source belong to the same LAN, the first route controller 35 selects the route 21 for own LAN route as the destination of the communication data (step S4). Following to this selection, the first route switcher 37 switches the data transfer destination to the selected route 21 for own LAN, and then sends out the communication data to the output side data transfer line 4b via the first multiplexer 47 and the first output terminal OUT1.

In contrast, as the result of attribution decision in step S3, unless the destination and the source belong to the same LAN, the first route controller 35 selects the route 23 for other LAN as the destination of the communication data (step S5). Following to this selection, the first route switcher 37 switches the data transfer destination to the selected route 23 for other LAN, and then sends out the communication data to the second multiplexer 49. The second multiplexer 49 then multiplexes the communication data of the own LAN 5 to which the second multiplexer 49 belongs and the communication data of other LAN 3, and then sends out the multiplexed communication data to the output side data transfer line 6b via the second output terminal OUT2. Consequently, the communication data can be received by the node terminal N or the root hub RH belonging to the second LAN 5, which is described as the destination.

Figure 6:
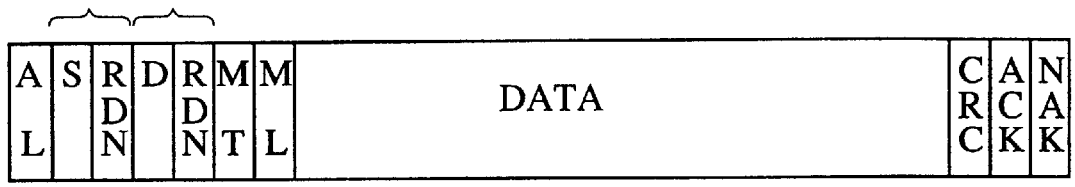
FIG. 6 is a view showing an example of a frame format of the communication data which are circulated in the communication system according to the present invention.

In FIG. 6, an example of a frame format of the communication data which are circulated in the first LAN 3 and the second LAN 5 is shown. As shown in FIG. 6, a very simple addressing approach is employed in the communication system 1 according to the present invention. More specifically, at the time when individual destination transmission which transmits the communication data from one source to one destination is carried out, the root hub RH to which the root hub RH having the communication data as the transmission object or the node terminal N having the communication data as the transmission object belongs can describe the address of either the source root hub RH or the source node terminal N as the source address in a source address describing area, and also describe the address of either the destination root hub RH or the destination node terminal N as the destination address in a destination address describing area.

In this manner, in order to execute data exchange between a pair of LAN's 3, 5 via the gate way 11, at first the root hub RH describes in advance the source/destination addresses in the address describing area which is provided in the communication data as the transmission object, and then transmits to the destination the communication data to which the source/destination addresses are allocated. The gate way 11, when receives the communication data transmitted from the source, decodes the source/destination addresses, then decides whether or not both the destination and the source belong to the same LAN, based on the decoded source/destination addresses and the attribution identification information stored previously, then selects the appropriate route as the transfer destination of the communication data based on this attribution decision result, and then transmits the communication data to the destination via the selected route.

Accordingly, the communication data can be transmitted to the designated destination without fail using only a small amount of area out of the address describing area in the communication data. As a result, the communication data can be transmitted surely to the destination while increasing remarkably data transmission capability per unit time.

In turn, a communication system 61 according to a second embodiment of the present invention, mainly differences from the communication system 1 according to the first embodiment, will be explained hereunder. In the description of the communication system 61 according to the second embodiment, like references are assigned to parts or members having the like function to those of the communication system 1 according to the first embodiment and therefore their description will be omitted.

Figure 4:
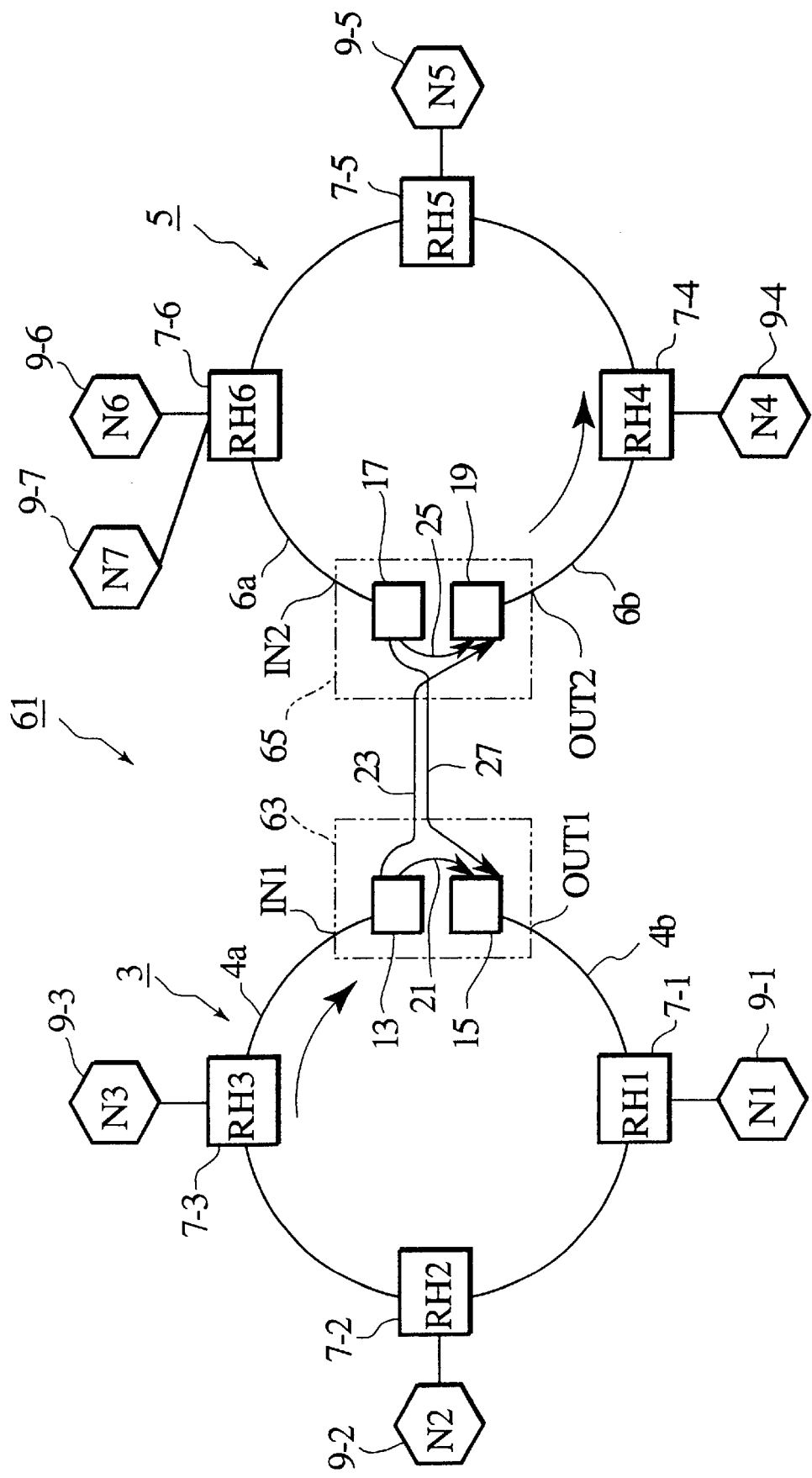
FIG. 4 is a schematic block circuit diagram showing a configuration of a communication system according to a second embodiment of the present invention.
Figure 5:
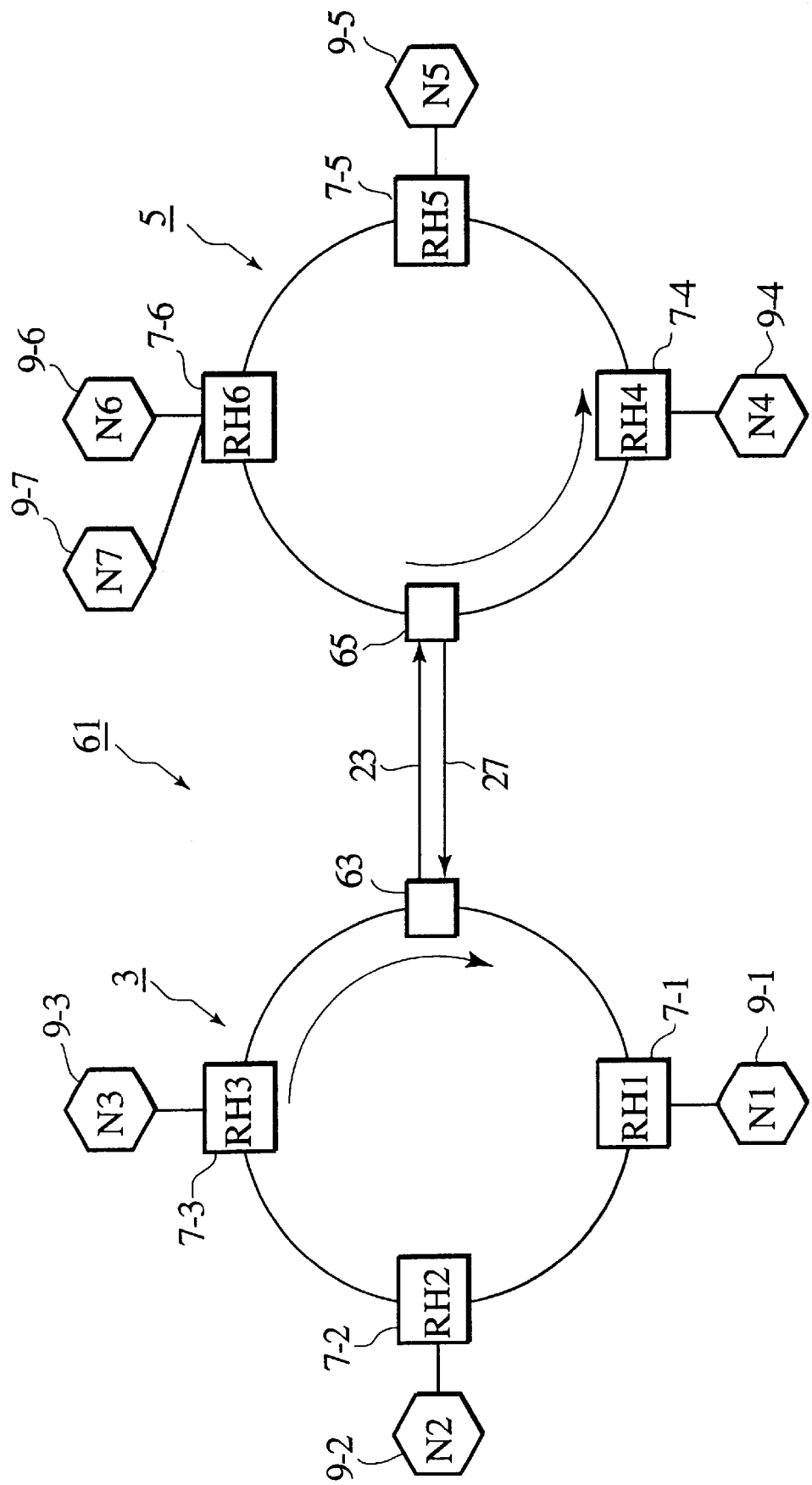
FIG. 5 is a schematic block circuit diagram showing a configuration of a communication system according to a modification of the second embodiment of the present invention.

As shown in FIGS. 4 and 5, the communication system 61 according to the second embodiment differs from the communication system 1 according to the first embodiment in that the gate way 11 in the communication system 1 is divided into a first function block 63, and a second function block 65. The first function block 63 has functions of receiving the communication data sent out from the node terminal N or the root hub RH belonging to the first LAN 3, then switching a destination route of the received communication data to one of the routes for own LAN 3 and the route for other LAN 5 selectively, etc. Similarly, the second function block 65 has functions of receiving the communication data sent out from the node terminal N or the root hub RH belonging to the second LAN 5, then switching a destination route of the received communication data to one of the routes for own LAN 5 and the route for other LAN 3 selectively, etc.

According to the communication system 61 of the second embodiment, the gate way 11 is constructed to be divided into the first function block 63 which is a collective functional means for executing various processes of the communication data which are received from the node terminal or the root hub RH belonging to the first LAN 3, and the second function block 65 which is also a collective functional means for executing various processes of the communication data which are received from the node terminal or the root hub RH belonging to the second LAN 5. Therefore, the gate way 11 which enables to separation of a pair of networks easily can be achieved and in addition, even when the first LAN 3 and the second LAN 5 are placed at mutually separated locations, for example, data exchange between the first LAN 3 and the second LAN 5 can be readily achieved, like the first embodiment, if appropriate communication medium such as communication lines are employed as the routes 23, 27.

The present invention is not limited to the above embodiments, appropriate modifications may be implemented without departing a scope of the present invention set forth in appended claims.

In other words, for instance, in the second embodiment, the case where the communication medium such as the communication lines are employed as the routes 23, 27 has been explained when the first LAN 3 and the second LAN 5 are placed at mutually separated locations. However, it is needless to say that radio communication such as infrared rays, electromagnetic wave, etc. may be included as the communication medium other than the communication line.

What is claimed is:

1. A communication method for use in a communication system constructed by connecting a pair of loop type networks via a gate way, each loop type network being constructed by connecting a plurality of addressable relay units via a data transfer line, one or more addressable node terminals being connected to each addressable relay unit, so as to execute data exchange between the addressable node terminals, the addressable relay units, or the addressable node terminal and the addressable relay unit, the communication method comprising the steps of:

describing source/destination addresses, which designates at least one of said addressable relay units and said addressable node terminals, previously in an address describing area provided in communication data as transmission object by the addressable relay units;

transmitting the communication data, in which the source/destination addresses are described, to a destination by the addressable relay units;

decoding the source/destination addresses included in received communication data by the gate way;

deciding whether or not a source and the destination belong to a same network, by the gate way based on the decoded source/destination addresses and attribution identification information stored previously;

selecting said same loop type network as the destination of the communication data when a result of the attribution decision indicates said same loop type network;

selecting a different loop type network as the destination of the communication and determining whether the different loop type network has a different protocol than said same loop type network when a result of the attribution decision indicates said different loop type network; and then transmitting the communication data to the destination via the selected route by the gate way, wherein said communications data is transmitted to the destination with the source/destination address as the only address information included in the communications data and without any network address information.

2. A communication method according to claim 1, wherein the appropriate route selecting step and the communication data transmitting step by the gate way comprise the steps of:

selecting a route for own loop type network, to which the source belongs, as the destination of the communication data by the gate way when it has been decided based on a result of the attribution decision that the source and the destination belong to the same loop type network, and transmitting the communication data to the destination via the selected route for own loop type network by the gate way.

3. A communication method according to claim 1, wherein the appropriate route selecting step and the communication data transmitting step by the gate way comprise the steps of:

selecting a route for the other loop type network, to which the source does not belong, as the destination of the communication data by the gate way when it has been decided based on a result of the attribution decision that the source and the destination do not belong to the same loop type network, and transmitting the communication data to the destination via the selected route for the other loop type network by the gate way.

4. A communication method for use in a communication system constructed by connecting a pair of loop type networks via a gate way, each loop type network being constructed by connecting a plurality of addressable relay units via a data transfer line, one or more addressable node terminals being connected to each addressable relay unit, so as to execute data exchange between the addressable node terminals, the addressable relay units, or the addressable node terminal and the addressable relay unit, the communication method comprising the steps of:

describing source/destination addresses, which designates at least one of said addressable relay units and said addressable node terminals, previously in an address describing area provided in communication data as transmission object by the addressable relay units;

transmitting the communication data, in which the source/destination addresses are described, to a destination by the addressable relay units;

decoding the source/destination addresses included in received communication data by the gate way;

deciding whether or not a source and the destination belong to a same loop type network, by the gate way based on the decoded source/destination addresses and attribution identification information stored previously; and selecting a route for own loop type network, to which the source belongs, as the destination of the communication data by the gate way when it has been decided based on a result of the attribution decision that the source and the destination belong to the same loop type network, selecting a route for other network, to which the source does not belong, as the destination of the communication data by the gate way and determining whether other network has a different protocol than own network when it has been decided based on a result of the attribution decision that the source and the destination do not belong to the same loop type network, and then transmitting the communication data to the destination via the selected route for one of own loop type network and other loop type network by the gate way, wherein said communications data is transmitted to the destination with the source/destination address as the only address information included in the communications data and without any network address information.

5. In a communication system constructed by connecting a pair of loop type networks via a gate way, each loop type network being constructed by connecting a plurality of addressable relay units via a data transfer line, one or more addressable node terminals being connected to each addressable relay unit, so as to execute data exchange between the addressable node terminals, the addressable relay units, or the addressable node terminal and the addressable relay unit, each of the addressable relay units comprising:

transmitting means for transmitting the communication data, in an address describing area of which the source/destination addresses are described, to a destination; and the gate way comprising:

decoding means for decoding the source/destination addresses included in received communication data;

identification information storing means for storing attribution identification information which correlate addresses of the node terminals and the relay units, which belong to the pair of loop type networks respectively, with respective loop type networks;

attribution deciding means for deciding whether or not a source and the destination belong to a same loop type network, based on the source/destination addresses decoded by the decoding means and the attribution identification information stored in the identification information storing means;

means for determining, when the attribution deciding means decides that the source and destination do not belong to the same loop type network, whether a protocol conversion is required to transmit the communication data to the destination; and route selecting means for selecting an appropriate route as the destination of the communication data based on a result of attribution decision carried out by the attribution deciding means, and then transmitting the communication data to the destination via the selected route, wherein said communications data is transmitted to the destination with the source/destination address as the only address information included in the communications data.

6. A gate way for use in a communication system constructed by connecting a pair of loop type networks via a gate way, each network being constructed by connecting a plurality of addressable relay units via a data transfer line, one or more addressable node terminals being connected to each addressable relay unit, so as to execute data exchange between the addressable node terminals, the addressable relay units, or the addressable node terminal and the addressable relay unit, the gate way comprising:

- four input/output terminals including a pair of first and second input terminals and a pair of first and second output terminals, the first input terminal and the first output terminal being connected to one loop type network via one data transfer line and the second input terminal and the second output terminal being connected to other loop type network via other data transfer line to thus connect the pair of loop type networks mutually;
- decoding means for decoding source/destination addresses included in the communication data received from a source, the source/destination addresses each designating at least one of said addressable relay units and said addressable node terminals;
- identification information storing means for storing attribution identification information which correlate addresses of the addressable node terminals and the addressable relay units, which belong to the pair of loop type networks respectively, with respective loop type networks;
- attribution deciding means for deciding whether or not the source and a destination belong to a loop type same network, based on the source/destination addresses decoded by the decoding means and the attribution identification information stored in the identification information storing means;
- means for determining, when the attribution deciding means decides that the source and destination do not belong to the same loop type network, whether a protocol conversion is required to transmit the communication data to the destination; and
- route selecting means for selecting one of the first output terminal and the second output terminal as the destination of the communication data received via the first input terminal and also selecting one of the first output terminal and the second output terminal as the destination of the communication data received via the second input terminal, based on a result of attribution decision carried out by the attribution deciding means, and then transmitting the communication data to the destination via selected output terminal, wherein said communications data is transmitted to the destination with the source/destination address as the only address information included in the communications data and without any network address information.

7. A gate way according to claim 6, wherein the route selecting means selects an output terminal for own loop type network, to which the source belongs, as the destination of the communication data when it has been decided, as a result of the attribution decision carried out by the attribution deciding means, that the source and the destination belong to the same loop type network, otherwise selects an output terminal for other loop type network, to which the source does not belong, as the destination of the communication data when it has been decided, as a result of the attribution decision carried out by the attribution deciding means, that the source and the destination do not belong to the loop type same network, and then transmits the communication data to the destination via the selected output terminal for own loop type network or other loop type network.

8. A gate way according to claim 6, further comprising mixing means for multiplexing received communication data when the first output terminal has been selected as the destination of the communication data received via the first input terminal and the second input terminal respectively and then transmitting multiplexed communication data to the destination via the selected first output terminal, otherwise multiplexing received communication data when the second output terminal has been selected as the destination of the communication data received via the first input terminal and the second input terminal respectively and then transmitting multiplexed communication data to the destination via the selected second output terminal.

9. A gate way for use in a communication system constructed by connecting a pair of loop type networks via a gate way, each loop type network being constructed by connecting a plurality of addressable relay units via a data transfer line, one or more addressable node terminals being connected to each addressable relay unit, so as to execute data exchange between the addressable node terminals, the addressable relay units, or the addressable node terminal and the addressable relay unit, the gate way comprising:

- four input/output terminals including a pair of first and second input terminals and a pair of first and second output terminals, the first input terminal and the first output terminal being connected to one loop type network via one data transfer line and the second input terminal and the second output terminal being connected to other loop type network via other data transfer line to thus connect the pair of loop type networks mutually;
- first decoding means for decoding source/destination addresses included in the communication data received from the relay unit belonging to one of the pair of loop type networks, the source/destination addresses each designating at least one of said addressable relay units and said addressable node terminals;
- second decoding means for decoding the source/destination addresses included in the communication data received from the addressable relay unit belonging to other of the pair of loop type networks;
- first identification information storing means for storing addresses of the addressable node terminals and the addressable relay units belonging to one of the pair of loop type networks as first attribution identification information;
- second identification information storing means for storing addresses of the addressable node terminals and the addressable relay units belonging to other of the pair of loop type networks as second attribution identification information;
- first attribution deciding means for deciding whether or not a source and a destination belong to one of the pair of loop type networks, based on the source/destination addresses decoded by the first decoding means and the first attribution identification information stored in the first identification information storing means;
- first means for determining, when the first attribution deciding means decides that the source and destination do not belong to one of the pair of loop type networks, whether a protocol conversion is required to transmit the communication data to the destination;
- second attribution deciding means for deciding whether or not a source and a destination belong to other of the pair of loop type networks, based on the source/destination addresses decoded by the second decoding means and the second attribution identification information stored in the second identification information storing means;

second means for determining, when the second attribution deciding means decides that the source and destination do not belong to one of the pair of loop type networks, whether a protocol conversion is required to transmit the communication data to the destination;

first route selecting means for selecting a route for one of the first output terminal and the second output terminal as the destination of the communication data received via the first input terminal, based on a result of attribution decision carried out by the first attribution deciding means, and then transmitting the communication data to the destination via the selected route for one of the first output terminal and the second output terminal; and second route selecting means for selecting a route for other of the first output terminal and the second output terminal as the destination of the communication data received via the second input terminal, based on a result of attribution decision carried out by the second attribution deciding means, and then transmitting the communication data to the destination via the selected route for other of the first output terminal and the second output terminal, wherein said communications data is transmitted to the destination with the source/destination address as the only address information included in the communications data and without any network address information.

10. A gate way according to claim 9, wherein the route through which the communication data received via the first input terminal are supplied to the second output terminal and the route through which the communication data received via the second input terminal are supplied to the first output terminal are constructed by any communication medium which enable transmission of the communication data.

11. A communication method according to claim 1, comprising:
transmitting the communication data, in which the source/destination addresses are described, by the addressable relay units over the data transfer line to the gate way.

12. A communication method according to claim 4, comprising:
transmitting the communication data, in which the source/destination addresses are described, by the addressable relay units over the data transfer line to the gate way.

13. A communication system according to claim 5, wherein said transmitting means transmits the communication data, in an address described area of which the source/destination addresses are described, to the destination over the data transfer line to the gate way.

14. The method of claim 1, further comprising converting said communication data to said different protocol based on said step of determining whether the different loop type network has a different protocol than said same loop type network.

15. The method of claim 4, further comprising converting said communication data to said different protocol based on said step of determining whether other network has a different protocol than own network.

16. The system of claim 5, further comprising means for converting a protocol of said communication data based on a determination of said means for determining.

17. The system of claim 6, further comprising means for converting a protocol of said communication data based on a determination of said means for determining.

18. The system of claim 9, further comprising:
first means for converting a protocol of said communication data based on a determination of said first means for determining; and
second means for converting a protocol of said communication data based on a determination of said second means for determining.

* * * * *